United States Patent
Li et al.

(10) Patent No.: US 9,550,892 B2
(45) Date of Patent: *Jan. 24, 2017

(54) MODIFIED POLYLACTIC ACID, POLYMERIC BLENDS AND METHODS OF MAKING THE SAME

(71) Applicant: FINA TECHNOLOGY, INC., Houston, TX (US)

(72) Inventors: Fengkui Li, Houston, TX (US); John Ashbaugh, Houston, TX (US); David Rauscher, Longview, TX (US); Robert Dotter, Fresno, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 357 days.

This patent is subject to a terminal disclaimer.

(21) Appl. No.: 14/081,073

(22) Filed: Nov. 15, 2013

(65) Prior Publication Data

US 2014/0072746 A1    Mar. 13, 2014

Related U.S. Application Data

(63) Continuation of application No. 13/030,194, filed on Feb. 18, 2011, now Pat. No. 8,628,718.

(51) Int. Cl.
| | |
|---|---|
| *C08F 14/00* | (2006.01) |
| *C08L 23/12* | (2006.01) |
| *B29C 45/00* | (2006.01) |
| *C08G 63/91* | (2006.01) |
| *C08L 67/04* | (2006.01) |
| *B32B 7/12* | (2006.01) |
| *B32B 27/08* | (2006.01) |
| *B32B 27/32* | (2006.01) |
| *B32B 27/36* | (2006.01) |
| *B29C 47/00* | (2006.01) |
| *B29C 47/06* | (2006.01) |
| *B29C 49/00* | (2006.01) |
| *B29C 51/00* | (2006.01) |
| *B29K 67/00* | (2006.01) |
| *C08L 23/10* | (2006.01) |
| *C08L 15/00* | (2006.01) |

(52) U.S. Cl.
CPC ............ *C08L 23/12* (2013.01); *B29C 45/0001* (2013.01); *B32B 7/12* (2013.01); *B32B 27/08* (2013.01); *B32B 27/32* (2013.01); *B32B 27/36* (2013.01); *C08G 63/912* (2013.01); *C08L 67/04* (2013.01); *B29C 47/0004* (2013.01); *B29C 47/0014* (2013.01); *B29C 47/0021* (2013.01); *B29C 47/0023* (2013.01); *B29C 47/065* (2013.01); *B29C 49/0005* (2013.01); *B29C 51/002* (2013.01); *B29K 2067/046* (2013.01); *B32B 2250/24* (2013.01); *B32B 2270/00* (2013.01); *C08L 15/00* (2013.01); *C08L 23/10* (2013.01); *Y10T 428/139* (2015.01); *Y10T 428/31515* (2015.04); *Y10T 428/31797* (2015.04)

(58) Field of Classification Search
CPC ......... C08F 14/00; C08F 14/18; C08F 259/00; C08F 2/32; D06M 15/256; D06M 15/248; D06M 15/277; C09D 133/16; C08L 33/16; C08L 2201/02; C08L 2205/05
See application file for complete search history.

(56) References Cited

U.S. PATENT DOCUMENTS

| | | | |
|---|---|---|---|
| 2,758,987 | A | 8/1956 | Salzberg |
| 5,310,865 | A | 5/1994 | Enomoto et al. |
| 5,525,678 | A | 6/1996 | Mink et al. |
| 6,147,173 | A | 11/2000 | Holtcamp |
| 6,180,735 | B1 | 1/2001 | Wenzel |
| 6,207,606 | B1 | 3/2001 | Lue et al. |
| 6,211,105 | B1 | 4/2001 | Holtcamp |
| 6,242,545 | B1 | 6/2001 | Jejelowo et al. |
| 6,245,705 | B1 | 6/2001 | Kissin |
| 6,245,868 | B1 | 6/2001 | Agapiou et al. |
| 6,248,845 | B1 | 6/2001 | Loveday et al. |
| 6,271,323 | B1 | 8/2001 | Loveday et al. |
| 6,274,684 | B1 | 8/2001 | Loveday et al. |
| 6,300,436 | B1 | 10/2001 | Agapiou et al. |
| 6,339,134 | B1 | 1/2002 | Crowther et al. |
| 6,340,730 | B1 | 1/2002 | Murray et al. |
| 6,346,586 | B1 | 2/2002 | Agapiou et al. |
| 6,359,072 | B1 | 3/2002 | Whaley |
| 6,380,328 | B1 | 4/2002 | McConville et al. |
| 6,420,580 | B1 | 7/2002 | Holtcamp et al. |
| 8,628,718 | B2 * | 1/2014 | Li et al. ............. B29C 45/0001 264/177.1 |
| 9,249,268 | B2 * | 2/2016 | Li et al. .................... C08J 5/18 |

* cited by examiner

Primary Examiner — Nathan M Nutter
(74) Attorney, Agent, or Firm — Albert Shung

(57) ABSTRACT

Polymeric compositions and processes of forming the same are discussed herein. The processes generally include contacting a polylactic acid with a reactive modifier selected from epoxy-functionalized polybutadiene, ionic monomer, and combinations thereof.

11 Claims, 2 Drawing Sheets

MODIFIED POLYLACTIC ACID, POLYMERIC BLENDS AND METHODS OF MAKING THE SAME

CROSS-REFERENCE TO RELATED APPLICATIONS

This application is a Continuation of U.S. application Ser. No. 13/030,194, filed on Feb. 18, 2011.

FIELD

Embodiments of the present invention generally relate to polymeric compositions.

BACKGROUND

Synthetic polymeric materials, such as polypropylene and polyethylene resins, are widely used in the manufacturing of a variety Of end-use articles ranging from medical devices to food containers. While articles constructed from synthetic polymeric materials have widespread utility, these materials tend to degrade slowly, if at all, in a natural environment. In response to environmental concerns, interest in the production and utility of more readily biodegradable polymeric materials comprising polylactic acid, a biodegradable polymer, has been increasing. These polymeric materials, also known as "green materials", may undergo accelerated degradation in a natural environment.

Although attempts have been made to utilize polylactic acid (PLA) for various end-use applications, PLA is known to be brittle and exhibit low toughness, which can result in low impact strength products or articles. Furthermore, polymeric compositions comprising polylactic acid, such as blends of polyolefin and polylactic acid, can be limited by their mechanical and/or physical properties due, in part, to the inherent immiscibility of polyolefin and polylactic acid. Therefore, a need exists for an additive that may react with PLA to impart a plasticizing and toughening effect to the PLA phase (i.e., a modified PLA) while also increasing the adhesion at the interfaces between the polyolefin and polylactic acid molecules, thereby forming a compatibilized PO/PLA blend that may be utilized in the production of higher impact strength articles.

SUMMARY

Embodiments, of the present invention include processes for forming a polymeric composition including contacting a polylactic acid with a reactive modifier selected from epoxy-functionalized polybutadiene, ionic monomer, and combinations thereof.

One or more embodiments include the process of the preceding paragraph, wherein the polylactic acid is selected from poly(D-lactide), poly(L-lactide), poly(DL-lactide), and combinations thereof.

One or more embodiments include the process of any preceding paragraph, wherein the polylactic acid has a concentration of from about 2 wt. % to about 98 wt. % based on the total weight of the polymeric composition.

One or more embodiments include the process of any preceding paragraph, wherein the reactive modifier contacts the polylactic acid in a concentration of from about 2 wt. % to about 30 wt. % based on the total weight of the polymeric composition.

One or more embodiments include the process of any preceding paragraph, wherein the reactive modifier is an epoxy-functionalized polybutadiene oligomer.

One or more embodiments include the process of any preceding paragraph, wherein the epoxy-functionalized polybutadiene oligomer has a number average molecular weight in a range from about 500 g/mol to about 20000 g/mol.

One or more embodiments include the process of any preceding paragraph, wherein the reactive modifier is an ionic monomer.

One or more embodiments include the process of any preceding paragraph, wherein the ionic monomer is an organometallic salt having acrylate functional groups.

One or more embodiments include the process of any preceding paragraph, wherein the contacting step further includes contacting the polylactic acid and the reactive modifier with a polyolefin to produce a polyolefin-polylactic acid blend.

One or more embodiments include the process of any preceding paragraph, wherein the polyolefin is selected from polypropylene, polyethylene, copolymers thereof and combinations thereof.

One or more embodiments include the process of any preceding paragraph, wherein the polyolefin has a concentration of from about 2 wt. % to about 98 wt. % based on the total weight of the polymeric composition.

One or more embodiments include the process of any preceding paragraph, wherein the contacting step includes melt blending the polyolefin, the polylactic acid, and the reactive modifier in a Single step.

One or more embodiments include the process of any preceding paragraph, wherein the contacting step includes melt blending the polylactic acid with the reactive modifier to form a modified polylactic acid during a first step and, subsequently, melt blending the modified polylactic acid with the polyolefin to produce the polyolefin-polylactic acid blend during, a second step.

One or more embodiments include the process of any preceding paragraph further including processing the polymeric composition using one or more polymer processing techniques selected from: film, sheet, pipe and fiber extrusion or coextrusion; blow molding; injection molding; rotary molding; and thermoforming.

One or more embodiments include the process of any preceding paragraph further including combining the polyolefin-polylactic acid blend with a second polyolefin and a polyester thereby forming a second blend.

One or more embodiments include the process of any preceding paragraph further including forming a multilayer film having a polyolefin layer, a polyester layer, and a tie layer disposed between the polyolefin layer and the polyester layer, wherein the tie layer comprises the polyolefin-polylactic acid blend.

DETAILED DESCRIPTION

Figure 1:
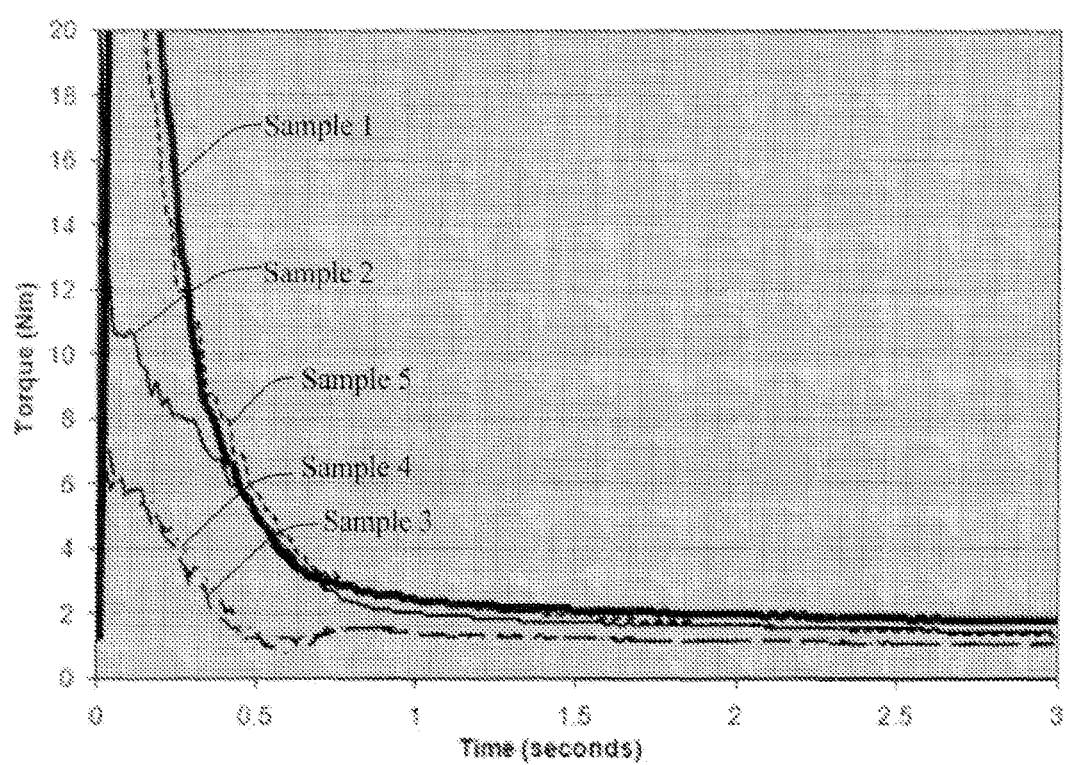
FIG. 1 is a plot of the rotor torque as a function of time during melt blending of the blend components for each of the Samples 1-5 in the Example.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this disclosure is combined with available information and technology.

Various terms as used herein are defined below. To the extent a term used in a claim is not defined below, it should be given the broadest definition skilled persons in the pertinent art have given that term as reflected in printed publications and issued patents at the time of filing.

Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymeric compositions including biodegradable polymeric components and methods of making and using the same are described herein. Embodiments of the present invention provide polymeric compositions comprising a modified polylactic acid produced by combining a polylactic acid (PLA) and a reactive modifier. In one or more embodiments, the polymeric composition is produced by melt blending a polylactic acid and a reactive modifier to form a modified polylactic acid. In one or more embodiments, the polymeric composition comprises a compatibilized polyolefin-polylactic acid blend produced by melt blending a polyolefin (PO) and a modified polylactic acid. In one or more embodiments, the polymeric composition comprises a compatibilized polyolefin-polylactic acid blend ("compatibilized PO/PLA blend") produced by melt blending a polyolefin, a polylactic acid and a reactive modifier. In one or more embodiments, the polymeric composition comprising a modified polylactic acid may be formed into a wide variety of articles, such as films, pipes, fibers, rods, containers, bags, packaging materials, and adhesives, for example, by processing the polymeric composition using common polymer processing techniques known to one of skill in the art. In one or more embodiments, the compatibilized PO/PLA blend may be used as a compatibilizer for directly compatibilizing a blend of a second polyolefin and a second polylactic acid (or other polyester) for forming a second compatibilized blend. In one or more embodiments, the compatibilized PO/PLA blend may be disposed as a tie layer between a polyolefin layer and a polylactic acid (or other polyester) layer in order to form a multilayer polymer.

The polylactic acid generally includes any suitable polylactic acid. For example, the polylactic acid may be selected from poly-L-lactide (PLLA), poly-D-lactide (PDLA), poly-LD-lactide (PDLLA) and combinations thereof. The polylactic acid may be formed by known methods, such as dehydration condensation of lactic acid (see, U.S. Pat. No. 5,310,865, which is incorporated by reference herein) or synthesis of a cyclic lactide from lactic acid followed by ring opening polymerization of the cyclic lactide (see, U.S. Pat. No. 2,758,087, which is incorporated by reference herein), for example. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

In an embodiment, the polylactic acid may have a density of from about 1.228 g/cc to about 1.255 g/cc, or from about 1.23 g/cc to about 1.25 g/cc or from about 1.235 g/cc to about 1.245 g/cc (as determined in accordance with ASTM D792), for example.

In an embodiment, the polylactic acid may exhibit a crystalline melt temperature ($T_c$) of from about 140° C. to about 190° C., or from about 145° C. to about 185° C. or from about 150° C. to about 180° C. (as determined in accordance with ASTM D3418).

In an embodiment, the polylactic acid may exhibit a glass transition temperature (Tg) of from about 45° C. to about 85° C., or from about 50° C. to about 80° C. or from about 50° C. to about 70° C. (as determined in accordance with ASTM D3417).

In an embodiment, the polylactic acid may exhibit a tensile yield strength of from about 4,000 psi to about 25,000 psi, or from about 5,000 psi to about 10,000 psi or from about 5,500 psi to about 8,500 psi (as determined in accordance with ASTM D638), for example.

In an embodiment, the polylactic acid may exhibit a tensile elongation of from about 0.5% to about 10%, or from about 1.0% to about 8% or from about 1.5% to about 6% (as determined in accordance with ASTM D638), for example.

In an embodiment, the polylactic acid may exhibit a notched Izod impact of from about 0.1 ft-lb/in to about 0.8 ft-lb/in, or from about 0.2 ft-lb/in to about 0.6 ft-lb/in or from about 0.25 ft-lb/in to about 0.5 ft-lb/in (as determined in accordance with ASTM D256), for example.

The polymeric composition may include from about 20 wt. % to about 99 wt. %, or from about 20 wt. % to about 98 wt. %, or from about 20 wt. % to about 85 wt. %, or from about 30 wt. % to about 80 wt. % polylactic acid based on the total weight of the polymeric composition, for example.

The polymeric composition of the present invention comprises a reactive modifier. As used herein, the term "reactive modifier" refers to additives that, when added to molten polylactic acid, may chemically react to form a chemical bond with the polylactic acid molecules to impart a plasticizing and toughening effect to the polylactic acid. In particular, the reactive modifier may act as a functionalized plasticizer such that a chemical bond is formed between the reactive modifier and the carboxylic acid end groups of the PLA molecules. Modification of PLA with the reactive modifier imparts increased toughness and ductility to the PLA, thereby broadening the utility of PLA in the manufacture of higher impact strength articles while maintaining or improving ease of processing processability).

The reactive modifier may include functional polymers capable of plasticizing the polylactic acid. Suitable reactive modifiers include epoxy-functionalized polybutadiene, ionic monomers, and combinations thereof, for example.

In an embodiment, the reactive modifier is an epoxy-functionalized polybutadiene. Epoxy-functionalized polybutadiene may include epoxidized polybutadiene oligomers, such as epoxy-polybutadiene copolymer (PB-co-epoxy) and its derivatives, for example. Examples of suitable epoxidized polybutadiene derivatives include hydroxyl-terminated epoxidized polybutadiene resins such as products Poly bd® 600 and Poly bd® 605 which are commercially available from Sartomer Company, Inc. Products Poly bd® 600 and Poly bd® 605 are available as a liquid having viscosities at 30° C. of about 7000 cP and about 25000 cP, respectively, a number average molecular weight (Mn) in a range from about 1350 g/mol to about 1450 g/mol, and a glass transition temperature (Tg) of about −70° C.

In an embodiment, the epoxy-functionalized polybutadiene oligomer may have a number average molecular weight (Mn) of from about 500 g/mol to about 10,000 g/mol, or from about 500 g/mol to about 4500 g/mol or from about 1000 g/mol to about 3000 g/mol, for example.

In an embodiment, the reactive modifier may be a polymeric blend comprising epoxy-functionalized polybutadiene in the polymer matrix of the polymeric blend. Suitable polymeric blends include polyolefin blends comprising liquid epoxy-polybutadiene copolymer distributed into the polymer matrix. In one example, the reactive modifier is a polyolefin blend comprising 20 wt. % epoxy-polybutadiene copolymer. Epoxy-functionalized polybutadiene in a polymer matrix may be utilized to react with polylactic acid in the same manner as pure epoxy-functionalized polybutadiene (liquid) while also potentially improving its ease of transportation.

In an embodiment, the reactive modifier is an ionic monomer. The ionic monomer may include functionalized organometallic compounds such as an organometallic salt having acrylate functional groups, for example. An example of an organometallic salt having acrylate functional groups is product SR732 which is commercially available from Sartomer Company, Inc. Product SR732 is available as a white powder having a molecular weight of about 207 g/mol The polymeric composition may include from about 1 wt. % to about 30 wt. %, or from about 2 wt. % to about 20 wt. %, or from about 2 wt. % to about 15 wt. % reactive modifier based on the total weight of the polymeric composition, for example.

The polylactic acid (PLA) is contacted with the reactive modifier to form a modified polylactic acid that exhibits increased toughness and ductility. Such contact may occur by a variety of methods. For example, such contact may include blending of the polylactic acid and the reactive modifier under conditions suitable for the formation of a blended material. Such blending may include dry blending, melt blending, melt compounding, or combinations thereof, by known blending techniques such as mixing and extrusion (e.g., twin-screw extrusion), for example.

Daring contact in a molten state, the functional groups of the reactive modifier react readily to form chemical bonds with the carboxylic acid end groups of the polylactic acid molecules, thereby forming a modified polylactic acid that exhibits increased toughness and ductility, as compared to the starting (i.e., unmodified) PLA. In particular, the reactive modifier comprising epoxy-functionalized polybutadiene forms covalent bonds between the epoxy functional groups or, more specifically, the oxirane groups in the epoxidized polybutadiene and the carboxylic acid end groups of the polylactic acid. With respect to the reactive modifier comprising an ionic monomer, the functional acrylate groups of the organometallic salt form ionic bonds with the carboxylic acid end groups of the polylactic acid.

In another aspect, the chemical bonding of the reactive modifier to the polylactic acid eliminates undesirable polymer migration and blooming that may be otherwise associated with a plasticizing additives.

The polymeric composition of the present invention may optionally further comprise one or more polyolefins. The polyolefin (and blends thereof) formed via the processes described herein may include, but are not limited to, linear low density polyethylene, elastomers, plastomers, high density polyethylenes, low density polyethylenes, medium density polyethylenes, polypropylene, polypropylene copolymers, copolymers thereof and combinations thereof, for example.

In an embodiment, the polyolefin may comprise polypropylene, polyethylene, copolymers thereof or combinations thereof.

In an embodiment, the polyolefin may be a propylene-based polymer. As used herein, the term "propylene-based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

In an embodiment, the propylene-based polymer may be a polypropylene homopolymer, a polypropylene-based random copolymer, a polypropylene heterophasic copolymer, and combinations thereof.

In an embodiment, the propylene-based polymer suitable for use in this disclosure may have a density of from about 0.895 g/cc to about 0.920 g/cc, or from about 0.900 g/cc to about 0.915 g/cc, or from about 0.905 g/cc to about 0.915 g/cc as determined in accordance with ASTM D1505.

In an embodiment, the propylene-based polymer may have a melting point ($T_m$) (as measured by differential scanning calorimetry) of at least about 140° C., or from about 150° C. to about 175° C., or from about 155° C. to about 170° C., for example. The propylene-based polymer may have a melt-mass flow rate (MFR) (as determined in accordance with ASTM D-1238 condition "L") of from about 0.01 dg/min to about 1000 dg/min. or from about 0.5 dg/min. to about 30 dg/min., for example. In an embodiment, the propylene-based polymer has a low melt flow rate. As used herein, the term low melt flow rate refers to a polymer having a MFR of less than about 10 dg/min., or in a range from about 0.5 dg/min. to about 10 dg/min., or less than about 6 dg/min., or in a range from about 0.5 dg/min. to about 6 dg/min., for example.

In an embodiment, the propylene-based polymer may be a polypropylene homopolymer. Unless otherwise specified, the term "polypropylene homopolymer" refers to propylene homopolymers, i.e., polypropylene, or those polyolefins composed primarily of propylene and may contain up to 0.5 wt. % of other comonomers, including but not limited to $C_2$ to $C_8$ alpha-olefins (e.g., ethylene and 1-butene), wherein the amount of comonomer is insufficient to change the crystalline nature of the propylene polymer significantly. Despite the potential presence of small amounts of other comonomers, the polypropylene is generally referred to as a polypropylene homopolymer.

In an embodiment, the propylene-based polymer may be a polypropylene-based random copolymer. Unless otherwise specified, the term "propylene-based random copolymer" refers to those copolymers composed primarily of propylene and an amount of at least one comonomer, wherein the polymer includes at least about 0.5 wt. %, or at least about 0.8 wt. %, or at least about 2 wt. %, or from, about 0.5 wt. % to about 5.0 wt. % comonomer relative to the total weight of the copolymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene, and combinations thereof. In one specific embodiment, the comonomer includes ethylene.

Further, the term "random copolymer" refers to a copolymer formed of macromolecules in which the probability of finding a given monomeric unit at any given site in the chain is independent of the nature of the adjacent units.

In an embodiment, the propylene-based polymer may be a polypropylene heterophasic copolymer (or impact copolymer). Polypropylene heterophasic copolymer refers to a semi-crystalline polypropylene or polypropylene copolymer matrix containing a heterophasic copolymer. The heterophasic copolymer includes ethylene and higher alpha-olefin polymer such as amorphous ethylene-propylene copolymer, for example. In one example, the heterophasic copolymer may comprise from about 6.0 wt. % to about 12 wt. %, or from about 8.5 wt. % to about 10.5 wt. %, or from about 9.0 wt. % to about 10.0 wt. % ethylene relative to the total weight of the copolymer.

In an embodiment, the polyolefin may be an ethylene-based polymer. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example.

The ethylene-based polymer may be a homopolymer or a copolymer, for example a copolymer of ethylene with one or more alpha-olefin monomers such as propylene, butene, hexene, etc.

The ethylene-based polymer may have a density (as measured by ASTM D-792) of from about 0.86 g/cc to about 0.998 g/cc, or from about 0.88 g/cc to about 0.998 g/cc, or from about 0.90 g/cc to about 0.998 g/cc or from about 0.925 g/cc to about 0.998 g/cc, for example.

In an embodiment, the ethylene-based polymer has a high density. As used herein, the term "high density polyethylene" refers to ethylene-based polymer having a density of greater than about 0.945 g/cc, or in a range from about 0.946 g/cc to about 0.998 g/cc, or greater than about 0.948 g/cc, or in a range froth about 0.949 g/cc to about 0.998 g/cc, for example.

In an embodiment, the ethylene-based polymer may have a melting point ($T_m$) (as measured by differential scanning calorimetry) of at least about 120° C., or from about 120° C. to about 140° C., or from about 125° C. to about 140° C., for example.

The ethylene-based polymer may have a MFR (as measured in accordance with ASTM D-1238 condition "E") of from about 0.01 dg/min. to about 100 dg/min. or from about 0.5 dg/min. to about 30 dg/min., for example. In an embodiment, the ethylene-based polymer has a low MFR of less than about 10 dg/min., or in a range from about 0.5 dg/min. to about 10 dg/min., or less than about 6 dg/min., or in a range from about 0.5 dg/min. to about 6 dg/min., for example.

The polyolefins may be formed using any suitable catalyst system useful for polymerizing olefin monomers. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example.

As indicated elsewhere herein, the catalyst systems are used to form olefin-based polymer compositions which are interchangeably referred to herein as polyolefins. Once the catalyst system is prepared, as described above and/or as known to one skilled in the art, a variety of processes may be carried out using the catalyst system to form olefin-based polymers. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.).

The polymeric composition may include from about 1 wt. % to about 79 wt. %, or from about 20 wt. % to about 7.0 wt. %, or from about 30 wt. % to about 70 wt. % polyolefin based on the total weight of the polymeric composition, for example.

The polylactic acid (PLA) may be contacted with the reactive modifier and the polyolefin (PO) to form a compatibilized polymeric blend. When added to a molten blend of immiscible polymers (e.g., the polyolefin and the polylactic acid), the reactive modifier may chemically react with one or both of the blend components (i.e., PO and PLA) to increase adhesion and stabilize the blend. The reactive modifier may be incorporated into the polymeric composition via a variety of methods such as melt blending, melt compounding, or combinations thereof, and by known blending techniques such as mixing and extrusion (e.g., twin-screw extrusion), for example. In one example, during melt blending, the polyolefin and the polylactic acid may be contacted with one another in the presence of the reactive modifier. In another example, the blend may be compatibilized by reactive extrusion Of the PO and the PLA in the presence of the reactive modifier using, for example, a continuous mixer such as a mixer having an intermeshing co-rotating twin screw extruder for mixing and melting the components, to thereby form a compatibilized PO/PLA blend.

During contact in a molten state (i.e., melt blending), the reactive modifier may interact with the polyolefin via van der Waals forces and/or chain entanglement, while the functional groups of the reactive modifier forms chemical bonds with the carboxylic acid end groups of the polylactic acid molecules as previously described above. In particular, the reactive modifier comprising epoxy-functionalized polybutadiene forms covalent bonds between the epoxy functional groups of the epoxidized polybutadiene and the carboxylic acid end groups of the polylactic acid, while the polybutadiene portion of the oligomer interacts with the polyolefin via both entanglement and van der Waals forces. With respect to the reactive modifier comprising an ionic monomer, the functional acrylate groups of the organometallic salt form ionic bonds with the carboxylic acid end groups of the polylactic acid, while the organometallic salt interacts with the polyolefin via van der Waals forces. Thus, melt blending a polyolefin and polylactic acid in the presence of the reactive modifier forms chemical and physical interactions at the interfaces between the polyolefin and polylactic acid phases that enhance adhesion and stabilize (i.e., compatibilize) the PO/PLA blend.

In an embodiment, contacting of the polyolefin, the polylactic acid and the reactive modifier components may generally occur by blending the components in a single step process. The blending may occur by introducing the polyolefin, the polylactic acid, and the reactive modifier, or a polymer comprising the reactive modifier, into a system capable of combining and melting the components to initiate chemical and physical interactions between the reactive modifier and the polylactic acid and polyolefin, components. For example, the blending may be accomplished by introducing, the polyolefin (e.g., polypropylene), the polylactic acid, and the reactive modifier into a batch mixer, continuous mixer, single screw extruder or twin screw extruder, for example, to form a homogeneous mixture or solution while providing temperature conditions so as to melt the blend components and initiate chemical and physical interactions between the reactive modifier and the polylactic acid and polyolefin components as described above, thereby producing a compatibilized PO/PLA blend.

In another embodiment, contacting of the above-mentioned components may generally occur in a two step process. In a first step, the polylactic acid and the reactive modifier, or a polymer comprising the reactive modifier, may be melt blended to react the functional groups of the reactive modifier with the carboxylic end groups of the polylactic acid, thereby forming a modified polylactic acid. Subsequently, in a second step, the polyolefin may be introduced and melt blended with the modified polylactic acid, thereby forming a compatibilized PO/PLA blend. The blending may occur by introducing the polylactic acid, the reactive modifier (or a polymer comprising the reactive modifier), and the polyolefin into a system capable of combining and melting the components to initiate chemical and physical interactions between the reactive modifier and the polylactic acid and polyolefin components, as described above.

In an embodiment, any of the previously described compatibilized polymeric compositions may further comprise additives to impart desired physical properties, such as printability, increased gloss, or a reduced blocking tendency. Examples of additives may include, without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart desired properties.

In an embodiment, the polymeric compositions and blends thereof may be formed into a wide variety of articles such as films, pipes, fibers (e.g., dyeable fibers), rods, containers, bags, packaging materials, and adhesives (e.g., hot melt adhesives) for example, by polymer processing techniques known to one of skill in the art, such as forming operations including film, sheet, pipe and fiber extrusion and co-extrusion as well as blow molding, injection molding, rotary molding, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, hot melt adhesives, sheets, such as thermoformed sheets (including profiles and plastic corrugated cardboard), geomembranes and pond liners, for example. Molded articles include single and multilayered constructions in the form of bottles, tanks, large hollow articles, rigid food containers and toys, for example.

In another embodiment, the compatibilized PO/PLA blend may be utilized as a compatibilizer to a second polymeric blend comprising a second polyolefin and a polyester (e.g., polylactic acid) to compatibilize the second blend. For example, a compatibilized polypropylene-polylactic acid blend (PP/PLA blend) comprising the modified polylactic acid produced by melt blending polylactic acid and the reactive modifier, may be added to a second polyolefin (e.g., polypropylene, polyethylene, copolymers thereof and combinations thereof) and polylactic acid blend to directly compatibilize the second blend. In another example, a compatibilized polyethylene-polylactic acid blend (PE/PLA blend) comprising the modified polylactic acid produced by melt blending polylactic acid and the reactive modifier, may be added to a second polyolefin (e.g., polypropylene, polyethylene, copolymers thereof and combinations thereof) and polylactic acid blend to directly compatibilize the second blend.

In yet another embodiment, the compatibilized PO/PLA blend may be utilized to form a tie layer of a multilayer structure. For example, a multilayer film may comprise a polyolefin (PO) layer, a PLA layer (or other polyester layer), and a tie layer disposed between the polyolefin layer and the PLA layer wherein the tie layer comprises the compatibilized PO/PLA blend, thereby connecting (tying) the polyolefin and PLA layers. The multilayer structure may be formed by the addition of the compatibilized PO/PLA blend to a co-extrusion of the PO and PLA layers.

EXAMPLES

The following example is given as particular embodiments of the disclosure and to demonstrate the practice and advantages thereof. It is understood that the example is given by way of illustration and is not intended to limit the specification or the claims to follow in any manner.

In an example, five samples were prepared to evaluate the compatibilization effect of reactive modifiers disclosed in the present invention on polypropylene-polylactic acid blends (PP/PLA blends). For comparison purposes, the first sample ("Sample 1") was prepared by melt blending a propylene homopolymer having a 2.8 dg/min. melt flow rate, commercially available as Total 3371 ("PP 3371"), with a polylactic acid having a melt index (190° C., 2.16 kg) in a range from about 30 d/min. to about 40 dg/min. (as determined in accordance with ASTM D1238), commercially available as NatureWorks® 3251D ("PLA 3251D"), to form a noncompatibilized blend ("PP 3371/PLA 3251D") referred to herein as the reference sample. The concentrations of the blend components PP 3371 and PLA 3251D were each about 50 wt. % based on the total weight of the blend. Also for comparison purposes, the second sample ("Sample 2") was prepared by melt blending 48% wt. % PP 3371 and 48 wt. % PLA 3251D with 4 wt. % of a polybutadiene having terminal hydroxyl groups which is commercially available as Krasol® LBH-P 2000 from Cray Valley. Product Krasol® LBH-P 2000 ("LBH-P 2000") is available as a liquid, having a viscosity of about 13000 cP and a low number average molecular weight (Mn) of about 2100 g/mol. The third, fourth and fifth samples were prepared with reactive modifiers disclosed in the present invention. The third sample ("Sample 3") was prepared by melt blending 48 wt. % PP 3371, 48 wt % PLA 3251D, and 4 wt. % of an epoxidized polybutadiene having terminal hydroxyl groups which is commercially available as Poly BD® 605E ("Poly BD® 605E") as the reactive modifier. The fourth sample ("Sample 4") was prepared by melt blending 48 wt. % PP 3371, 48 wt % PLA 3251D, and 4 wt. % of an epoxidized polybutadiene having terminal hydroxyl groups which is commercially available as Poly BD® 600E ("Poly BD® 600E") as the reactive modifier. The fifth sample ("Sample 5") was prepared by melt blending 48 wt. % PP 3371, 48 wt % PLA 3251D, and 4 wt. % of an organometallic salt having acrylate functional groups which is commercially available as product SR732 ("SR732") as the reactive modifier. Formulations for Samples 1-5 are summarized in Table 1.

To evaluate the compatibilization effect of the additives, each of the blends of Samples 1-5 were prepared by melt blending the blend components (shown in Table 1) using a Thermo Scientific Haake Polylab internal mixer ("Haake mixer") equipped to monitor rotor torque (i.e., mixing torque) and melt temperature. The mixing chamber of the Haake mixer has two counter rotating rotors. Each of the samples were prepared by feeding the blend components into the mixing chamber and melting the feedstock therein, while monitoring the rotor torque as the blend components melted. FIG. 1 is a plot of the torque curves as a function of time for each of the samples.

The torque plots shown in FIG. 1 show an initial sharp drop which corresponds to the initial melting of the blend components, for each of the samples. Normally, as a feedstock of solid polymers become mostly melted, the torque becomes increasingly stable and then continues to gradually decrease over time due to thermal degradation of the molten polymers. Any increase in torque over time is indicative of a reaction forming higher molecular weight polymer. As shown in FIG. 1, Sample 1 exhibits the normal behavior of a gradually decreasing torque during the melt blending of its blend components PP 3371/PLA 3251D. Sample 2 also exhibits a generally gradual decreasing torque during the melt blending of PP 3371/PLA 3251D/LBH-P 2000, while demonstrating a somewhat less stable and shorter melt time as compared to the reference Sample 1. During melt blending of Sample 3 (PP 3371/PLA 3251D/Poly BD® 605E) and Sample 4 (PP 3371/PLA 3251D/Poly BD® 600E), the torque decreases until about 0.6 seconds (t≈0.6 s) where the torque begins to increase until about 0.75 seconds, while demonstrating a somewhat less stable and shorter melt time as compared to the reference Sample 1. The increase in torque from about 0.6 seconds to about 0.75 seconds is due to the reactive modifiers Poly BD® 605E and Poly BD® 600E participating in grafting reactions to form higher molecular weight copolymers (i.e., higher viscosity). In particular, the grafting reactions are indicative of chemical reactions between the epoxy-functionalized polybutadiene and carboxylic end groups of the polylactic acid. After about 0.75 seconds, the torque begins to gradually decrease due to degradation of the blend polymers. Sample 5 exhibits a gradually decreasing torque during the melt blending of its blend components PP 3371/PLA 3251D/SR732 which is similar to the behavior of the reference Sample 1.

Figure 2:
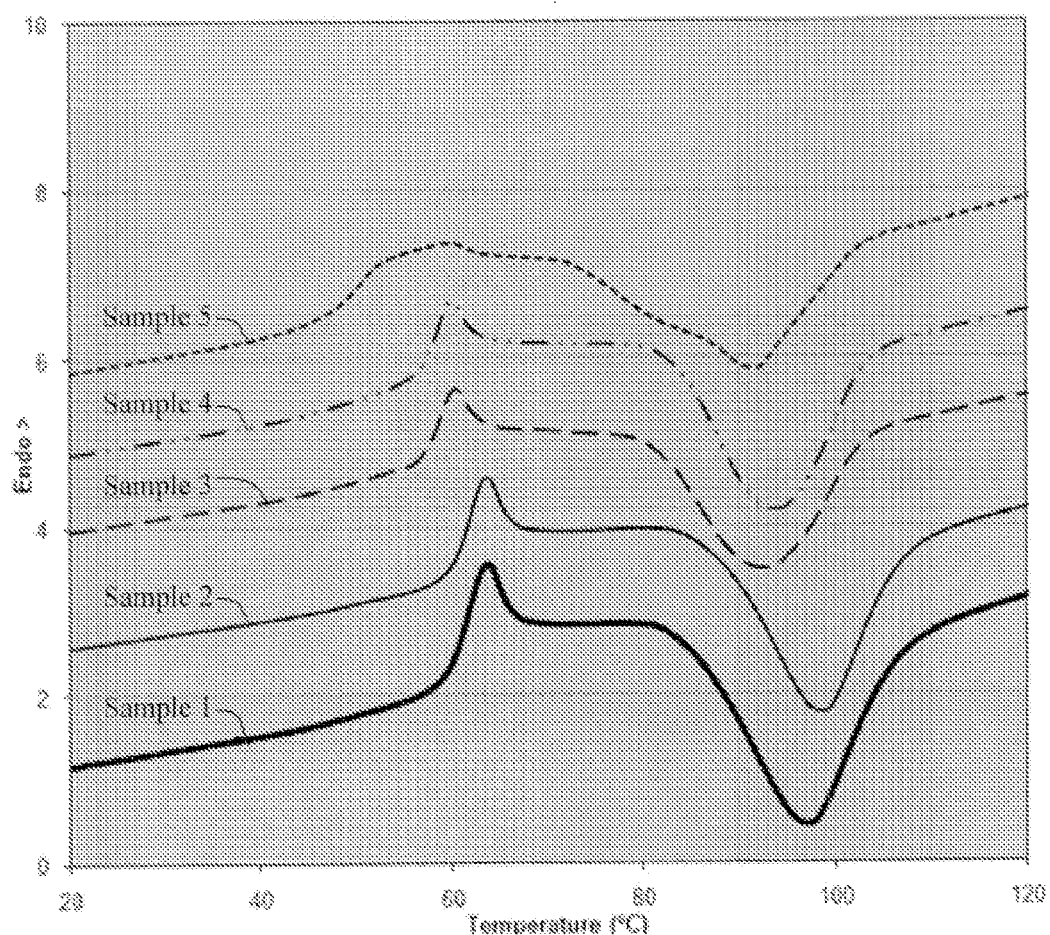
FIG. 2 is a plot of the DSC melting endotherms as a function of temperature for the Samples 1-5 in the Example.

Differential scanning calorimetry (DSC) was used to investigate the glass transition temperatures of the PLA phases in the blends of Samples 1-5. FIG. 2 is a plot of the DSC melting endotherms as a function of temperature during the DSC heating scans of Samples 1-5. The glass transitions temperatures (Tg) obtained from each of the endotherms in FIG. 2 are tabulated in Table 1.

TABLE 1

| | | | Additive | | | | |
|---|---|---|---|---|---|---|---|
| Sample | PP 3371 [wt. %] | PLA 3251D [wt. %] | LBH-P 2000 [wt. %] | Poly BD® 605E [wt. %] | Poly BD® 600E [wt. %] | SR732 [wt. %] | Tg [° C.] |
| 1 | 50 | 50 | — | — | — | — | 58.8 |
| 2 | 48 | 48 | 4 | — | — | — | 58.7 |
| 3 | 48 | 48 | — | 4 | — | — | 56.0 |
| 4 | 48 | 48 | — | — | 4 | — | 55.1 |
| 5 | 48 | 48 | — | — | — | 4 | 45.9 |

With respect to Sample 2, the data shows that the addition of polybutadiene having terminal hydroxyl groups (LBH-P 2000) to a blend of PP and PLA has little effect on the PLA phase Tg, as compared to the reference Sample 1 having a Tg of 58.8° C. However, the PLA phase Tg shifts of 2.8° C., 3.7° C., and 12.9° C. for Samples 3-5, respectively, toward the lower PP glass transition temperature indicates a compatibilization effect between the PP and PLA phases. In particular, the Tg shifts to lower temperatures means the PLA molecule motion is affected by the PP phases which have a Tg of about −10° C. The enhanced PP-PLA interphase interactions is a result of the chemical and physical interactions between the reactive modifier and the polylactic acid and polyolefin components With respect to Samples 3 and 4, this development of interaction between the PP and PLA phases is indicative of chemical reactions between the epoxy-functionalized polybutadiene and carboxylic end groups of the polylactic acid, as well as entanglement and van der Waals forces between the epoxy-functionalized polybutadiene and the polypropylene. A comparison of Samples 3 and 4 demonstrates that the use of Poly BD® 600E causes a somewhat greater shift in the PLA phase Tg which indicates a higher degree of compatibilization in the blend of Sample 4. Typically, the greater the Tg shift, the more effective the compatibilization. The further downward shift in the PLA phase Tg of Sample 5, as compared to Samples 3 and 4, demonstrates the most effective compatibilization may be obtained by the participation of the organometallic salt having acrylate functional groups (SR732) to facilitate interactions between the PP and PLA phases.

While the foregoing is directed to embodiments of the present invention, other and further embodiments of the invention may be devised without departing from the basic scope thereof and the scope thereof is determined by the claims that follow.

What is claimed is:

1. A polymeric composition comprising:
 a polylactic acid;
 a reactive modifier selected from epoxy-functionalized polybutadiene, ionic monomer, and combinations thereof; and
 a polyolefin that exhibits a melt flow rate of less than about 6 dg/min.

2. The polymeric composition of claim 1, wherein the polylactic acid is selected from poly(D-lactide), poly(L-lactide), poly(DL-lactide), and combinations thereof.

3. The polymeric composition of claim 1, wherein the polylactic acid has a concentration of from about 2 wt. % to about 98 wt. % based on the total weight of the polymeric composition.

4. The polymeric composition of claim 1, wherein the reactive modifier has a concentration of from about 2 wt. % to about 30 wt. % based on the total weight of the polymeric composition.

5. The polymeric composition of claim 1, wherein the reactive modifier is an epoxy-functionalized polybutadiene oligomer.

6. The polymeric composition of claim 5, wherein the epoxy-functionalized polybutadiene oligomer has a number average molecular weight in a range from about 500 g/mol to about 20000 g/mol.

7. The polymeric composition of claim 1, wherein the reactive modifier is an ionic monomer.

8. The polymeric composition of claim 7, wherein the ionic monomer is an organometallic salt having acrylate functional groups.

9. The polymeric composition of claim 1, wherein the polyolefin is selected from polypropylene, polyethylene, copolymers thereof and combinations thereof.

10. The polymeric composition of claim 1, wherein the polyolefin has a concentration of from about 2 wt. % to about 98 wt. % based on the total weight of the polymeric composition.

11. The polymeric composition of claim 1, wherein the polyolefin exhibits a melt flow rate ranging from about 0.5 dg/min.

* * * * *